US008544424B2

(12) United States Patent
Chang et al.

(10) Patent No.: US 8,544,424 B2
(45) Date of Patent: Oct. 1, 2013

(54) SYSTEM, CONTROLLER AND METHOD THEREOF FOR TRANSMITTING AND DISTRIBUTING DATA STREAM

(75) Inventors: Ching-Wen Chang, Hsinchu (TW); Meng-Chang Chen, Taichung County (TW); Sing-Chang Liu, Taipei (TW)

(73) Assignee: Phison Electronics Corp., Miaoli (TW)

( * ) Notice: Subject to any disclaimer, the term of this patent is extended or adjusted under 35 U.S.C. 154(b) by 439 days.

(21) Appl. No.: 12/212,004

(22) Filed: Sep. 17, 2008

(65) Prior Publication Data

US 2009/0313396 A1    Dec. 17, 2009

(30) Foreign Application Priority Data

Jun. 13, 2008  (TW) .............................. 97122206 A

(51) Int. Cl.
*G06F 3/00*   (2006.01)
*G06F 13/00*  (2006.01)
*G06F 5/00*   (2006.01)
*G06F 13/12*  (2006.01)
*G06F 12/00*  (2006.01)

(52) U.S. Cl.
USPC ................... 122/52; 710/15; 710/16; 710/17; 710/19; 710/33; 710/36; 710/74; 711/2; 711/100; 711/103; 711/118; 711/209

(58) Field of Classification Search
USPC ................... 710/15–19, 33, 36, 52; 711/154, 711/2, 100–101, 103, 118, 209; 340/7.22; 370/225, 463; 235/380, 451, 492, 38
See application file for complete search history.

(56) References Cited

U.S. PATENT DOCUMENTS

| | | | |
|---|---|---|---|
| 4,071,706 A * | 1/1978 | Warren ......................... 370/463 |
| 6,021,311 A * | 2/2000 | Gibson et al. ................ 340/7.22 |
| 6,298,412 B1* | 10/2001 | Yatsu et al. ................... 711/101 |
| 6,477,592 B1* | 11/2002 | Chen et al. ...................... 710/52 |
| 7,580,315 B2* | 8/2009 | Tsuji ....................... 365/230.03 |
| 7,726,568 B2* | 6/2010 | Singh et al. .................... 235/451 |
| 7,768,908 B2* | 8/2010 | Tanju ............................ 370/225 |
| 8,078,770 B1* | 12/2011 | Sivertsen ........................ 710/19 |
| 8,156,323 B1* | 4/2012 | Shnowske et al. ............ 713/151 |
| 2002/0156946 A1* | 10/2002 | Masters et al. ................ 710/33 |
| 2002/0156977 A1* | 10/2002 | Derrick et al. ................ 711/118 |
| 2003/0217039 A1* | 11/2003 | Kurtz et al. ...................... 707/1 |
| 2006/0136656 A1* | 6/2006 | Conley et al. ................. 711/103 |
| 2006/0180674 A1* | 8/2006 | Margalit et al. ............... 235/492 |
| 2007/0233910 A1* | 10/2007 | Paley et al. ...................... 710/36 |
| 2007/0257100 A1* | 11/2007 | Chase-Salerno et al. ..... 235/380 |
| 2008/0183978 A1* | 7/2008 | Sohn ............................ 711/154 |

* cited by examiner

*Primary Examiner* — Idriss N Alrobaye
*Assistant Examiner* — Henry Yu
(74) *Attorney, Agent, or Firm* — J.C. Patents

(57) ABSTRACT

A system, a controller, and a method for transmitting and distributing a data stream from a host to a storage device having a non-volatile memory and a chip are provided. A specific mark is added into a data stream which is transmitted from the host to the storage device, such that the data stream can be dispatched to the chip by transmitting a write command. Then, a response message generated by the chip can be received inerrably by executing a plurality of read commands.

21 Claims, 8 Drawing Sheets

SYSTEM, CONTROLLER AND METHOD THEREOF FOR TRANSMITTING AND DISTRIBUTING DATA STREAM

CROSS-REFERENCE TO RELATED APPLICATION

This application claims the priority benefit of Taiwan application serial no. 97122206, filed on Jun. 13, 2008. The entirety of the above-mentioned patent application is hereby incorporated by reference herein and made a part of this specification.

BACKGROUND OF THE INVENTION

1. Field of the Invention

The present invention generally relates to a system, a controller, and a method for transmitting and distributing a data stream, and particularly, to a system, a controller, and a method for transmitting and distributing a data stream from a host to a storage device with a flash memory and a chip.

2. Description of Related Art

Digital cameras, cell phones and MP3 players have grown rapidly in recent years, which results in a quick increase in demand of storage media by users. Because of the advantages of non-volatility, power saving, small dimension, and having no mechanical structure, the flash memories are very suitable to be embedded in various portable multimedia devices as described above.

On the other hand, the user's increasing acceptance of electronic wallet and prepayment has resulted in increasing popularization of smart cards. The smart card is typically an integrated circuit (IC) chip which includes, for example, a microprocessor, a card operation system, a security module, and a memory module to allow predetermined operation performed by an owner of the smart card. With the ability to provide computing, encryption, bidirectional communication and security functions, the smart card not only can store data, but also can protect the data stored therein. One exemplary smart card is the subscriber identification module (SIM) of cellular phones that use global system for mobile communication (GSM). However, the smart card has a limit in its storage capacity. Thus, the smart card has recently begun to use in combination with a large storage memory card to expand the storage capacity of the smart card.

Conventionally, use of the smart card in combination with a flash memory, a particular command is used to differentiate the data transmitted to the smart card from the data transmitted to the flash memory. This particular command may not be supported by the hardware or the driver. Moreover, in the prior art, information of the particular command, which regards the type of the transmitted data stream, is compared to determine whether the transmitted data stream is of the command format of the smart card. However, this method often results in confusion of the command data of the smart card with the normal data of the flash memory (i.e., misinterpreting the normal data of the flash memory as the command data of the smart card).

In addition, in utilization of electronic products with a cache, due to the electronic products' own limits, data stream transmission between the smart card and the electronic product cannot bypass the cache, which makes a response message generated by the smart card unable to be inerrably transmitted back to the electronic product that the smart card is attached to, thereby restraining the applications of the smart card on such electronic product having a cache. For example, in a cell phone with a Java system, since the Java system does not support commands, e.g. the command of NO Cache, that allows directly access to the flash memory without using the cache, it can be difficult to combine the smart card and flash memory into a memory card in the cell phone with the Java system. FIG. 1 is a functional block diagram of a host 10 equipped with a memory card 12. Referring to FIG. 1, the host is a type of electronic product (e.g., a cell phone with a Java system) and has a cache 14. The memory card 12 includes a flash memory 16 and a smart card chip 18. All data between the host 10 and the memory 12 is transmitted through the cache 14. However, since the cache temporarily stores recent data transmitted between the host 10 and the memory card 12, when the host 10 acquires data from the smart card chip 18, if the cache 14 already contains data matched with the address designated by the read command, the cache 14 will transmit the matched data to the host 10. However, in such a system, the response message of the smart card chip 18 may be often substituted by the data already existing in the cache 14, which significantly affects the encryption and security communication of the smart card chip 18.

Therefore, a system and a method that can inerrably transmit the response message of the smart card are required. In such system, a flash memory is used in combination with the smart card.

SUMMARY OF THE INVENTION

Accordingly, the present invention is directed to a system for transmitting and distributing a data stream and a controller of the system that can inerrably transmit a response message of a smart card.

The present invention is also directed to a method that can inerrably transmit a response message of a smart card.

The system, controller, and method of the present invention for transmitting and distributing a data stream not only could be adapted to the application of the combination of the flash memory and the smart card chip, but also could be adapted to the application of the combination of the flash memory and other chip. The other chip may be a radio frequency identification (RFID) chip, a wireless transmission chip (e.g., Blue Tooth chip), or a multimedia controller chip (e.g., digital recording chip).

The present invention provides a method for transmitting and distributing a data stream from a host to a storage device with a non-volatile memory and a chip. The method has the following steps: transmitting a write command to the storage device, the writing command being set to write a first data stream into the storage device; determining whether the first data stream contains a specific mark; transmitting at least a portion of the first data stream to the chip if the first data stream contains the specific mark; sequentially transmitting a plurality of read commands to the storage device until the host receives a first response message from the storage device, wherein the first response message is produced by the chip in response to receiving the at least portion of the first data stream, and the plurality of read commands are set to read data stored on a plurality of logical block addresses; and transmitting a second response message from the storage device to the host once the storage device receives one of the read commands.

The present invention provides a system for transmitting and distributing a data stream between a host and a storage device with a non-volatile memory and a chip. The system includes an application program and a controller. The application program is installed in the host to handle the storage device. The controller is disposed in the storage device and electrically coupled to the non-volatile memory and the chip.

The application program is programmed to transmit a write command to the controller, the writing command being set to write a first data stream into the storage device. The controller is configured to determine whether the first data stream contains a specific mark and to transmit at least a portion of the first data stream to the chip if the first data stream contains the specific mark. The application program is programmed to sequentially transmit a plurality of read commands to the storage device until a first response message is received from the controller. The first response message is generated by the chip in response to the receiving the at least portion of the first data stream. The read commands are set to read data stored on the logical block addresses. The controller transmits a second response message to the application program once the controller receives one of the read commands.

The present invention provides a controller adapted for a storage device with a non-volatile memory and a chip. The controller includes a micro processing unit, a memory interface, and a buffer. The microprocessor is used to control overall operation of the controller. The memory interface is configured to allow access to the non-volatile memory. The buffer is configured to temporarily store data. The micro processing unit is configured to determine whether a first data stream from a host contains a specific mark and to transmit at least a portion of the first data stream to the chip if the first data stream contains the specific mark. The micro processing unit is configured to sequentially transmit a second response message to the host in response to the read commands from the host after the at least portion of the first data stream is transmitted to the chip and before the micro processing unit receives a first response message. The first response message is generated by the chip in response to the receiving the at least portion of the first data stream. The micro processing unit is configured to transmit the first response message to the host after receiving the first response message.

According to one embodiment of the present invention, data stored on the logical block addresses belong to a single specific file.

According to one embodiment of the present invention, the method further includes determining whether the single specific file exists in the non-volatile memory and creating the single specific file in the non-volatile memory if the single specific file does not exist in the non-volatile memory yet.

According to one embodiment of the present invention, data stored on the logical block addresses belong to a plurality of specific files.

According to one embodiment of the present invention, the method further includes determining whether the specific files exist in the non-volatile memory and, if any one of the specific files does not exist in the non-volatile memory yet, creating that one of the specific files that does not exist in the non-volatile memory.

According to one embodiment of the present invention, the data recorded at each bit of the second response message is zero.

According to one embodiment of the present invention, the method further includes writing the first data stream into the non-volatile memory according to the address designated by the write command if the first data stream does not contain the specific mark.

According to one embodiment of the present invention, the method further includes determining whether any read command transmitted from the host to the storage device is set to read the data stored on the logical block addresses and reading the data in the non-volatile memory according to the address designated by the read command if any read command is not set to read the data stored on the logical block address.

According to one embodiment of the present invention, the host comprises a cache, and all the commands and data between the host and the storage device are transmitted through the cache.

According to one embodiment of the present invention, a total amount of data stored on the logical block addresses is larger than or equal to a size of the cache.

According to one embodiment of the present invention, the read commands are set to sequentially read data of an identical length from the logical block addresses.

According to one embodiment of the present invention, the method further includes, if a response message, transmitted back to the host in response to the receiving one of the read commands, is a data stream in which not all bits are zero, determining the response message in which not all bits are zero is the first response message.

According to one embodiment of the present invention, the storage device operates without storing data on the logical block addresses, and the second response message is generated by the storage device in response to the receiving one of the read commands.

According to one embodiment of the present invention, the chip is a smart card chip, a radio frequency identification chip, a wireless transmission chip, or a multimedia controller chip.

According to one embodiment of the present invention, the storage device is an SD memory card or an MMC memory card.

According to one embodiment of the present invention, the chip is compatible with a standard of ISO 7816 or ISO 14443.

According to one embodiment of the present invention, the non-volatile memory is a single level cell NAND flash memory or multi level cell NAND flash memory.

According to one embodiment of the present invention, the at least portion of the first data stream is a command-application protocol data unit, and the first response message is a response-application protocol data unit.

In the present invention, the host adds the specific mark into the data stream to be transmitted to the chip. Therefore, the controller can determine whether the data stream is a data stream to be transmitted to a specific chip by verifying whether the data stream includes the mark. In addition, during the procedure of waiting the response message from the chip, the controller executes the read command to read the data stored on the specific LBA and transmits the preset data stream (e.g., a data stream with all zero bits) back. When the chip generates a response message, the controller transmits the response message (e.g. a data stream in which not all bits are zero) back. As such, it can be determined whether the data stream transmitted back is the response message from the chip, and the response message generated by the chip can also be inerrably received. In addition, during waiting the response message from the chip, a plurality of the read commands is executed. The cached data in the cache is sequentially substituted by new data and, as a result, the response message stored in the cache is continuously updated such that the cache always stores the newest data. This can prevent the cache from transmitting an erroneous response message to the application program, such that the response message generated by the smart card chip can be inerrably transmitted back.

In order to make the aforementioned and other features and advantages of the present invention more comprehensible, embodiments accompanied with figures are described in detail below.

DESCRIPTION OF THE EMBODIMENTS

The present invention provides a method, a system and a controller of the system, which is suitable for transmitting a data stream between a host and a storage device with a non-volatile memory and a chip. The system includes an application program and a controller respectively disposed in the host and the storage device. In addition, a specific mark is added into the data stream transmitted from the host to the storage device, such that the data stream can be dispatched to the chip by transmitting a write command. Then, a response message generated by the chip can be inerrably received by executing a plurality of read commands. Several exemplary embodiments of the present invention are described in the following with reference to accompany the drawings. It should be understood, however, that these exemplary embodiments are not intended to be used to limit the present invention. For instance, the system, controller, and method of the present invention for transmitting and distributing a data stream not only could be adapted to the application of the combination of the flash memory and the smart card chip, but also could be adapted to the application of the combination of the flash memory and other chip. Wherein, the other chip may be a radio frequency identification (RFID) chip, a wireless transmission chip (e.g., Blue Tooth chip), or a multimedia controller chip (e.g., digital recording chip).

First Embodiment

Figure 1:
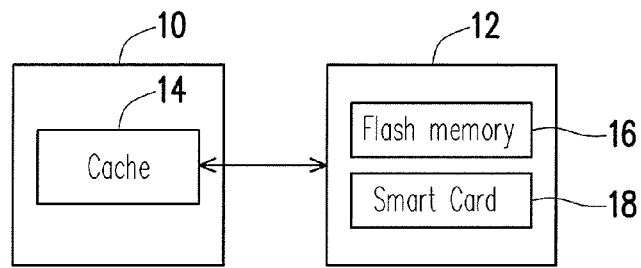
FIG. 1 is a functional block diagram of a conventional host in combination with a memory card.
Figure 2:
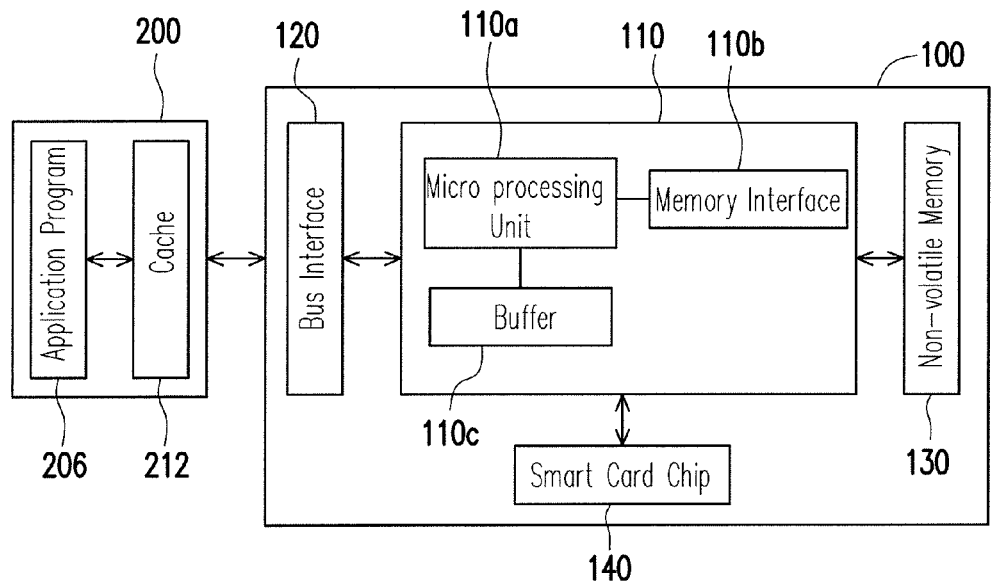
FIG. 2 is a functional block diagram of a system for transmitting and distributing a data stream according to a firs embodiment of the present invention.

FIG. 2 is a general block diagram of a system for transmitting and distributing data stream according to a first embodiment of the present invention. Referring to FIG. 2, the data stream transmitting and distributing system includes an application program 206 installed in a host 200 and a controller 110 disposed in a storage device 100. The storage device 100 is usually used together with the host 200 such that the host 200 can write data into or retrieve data from the storage device 100. Specifically, the storage device 100 includes a non-volatile memory 130 for storing common data and a smart card chip 140 for executing functions such as security verification. The application program 206 can carry out the data transmitting and distributing method of the embodiment of the present invention to transmit a message to the smart card chip 140 and inerrably transmit a response message of the smart card chip 140 back to the host 200. The host 200 further includes a cache for temporarily storing recently-used data of the host 200 to increase the overall speed of data process of the host 200.

The controller 110 operates to control the overall operations of the storage device 100, such as, distributing, storing, retrieving and erasing of the data stream. The controller 110 includes a micro processing unit 110a, a flash memory interface 110b, and a buffer 110c.

The micro processing unit 110a executes the command transmitted from the application program 206, and coordinates internal components of the controller 100 to control the overall operation of the controller 110.

The flash memory interface 110b is electrically coupled to the micro processing unit 110a for allowing access to the non-volatile memory 130. In other words, the data to be written into the non-volatile memory 130 by the host 200 is converted via the flash memory interface 110b into a format acceptable for the non-volatile memory 130.

The buffer 110c is used to temporarily store system data (e.g., logic to physical mapping table) or data read or written by the host 200. In this illustrated embodiment, the buffer 110c is a static random access memory (SRAM). However, it should be noted that the present invention is not limited thereto. Instead, the buffer of the present invention can be a dynamic random access memory (DRAM), a magnetoresistive random access memory (MRAM), a phase change random access memory (PRAM), a synchronous DRAM (SDRAM), or another suitable memory.

In addition, while not shown in the drawings, the controller 110 can further include common function modules of the flash memory, such as, an error correction (ECC) module and a power management module.

The non-volatile memory 130 is electrically coupled to the controller 110 and is used to store data. In the illustrated embodiment, the non-volatile memory 130 is a single level cell (SLC) NAND flash memory. However, the non-volatile memory of the present invention is not intended to be limited to the type of the memory. Instead, in another embodiment of the present invention, the non-volatile memory 130 may be a multi level cell NAND flash memory or another suitable type of non-volatile memory.

The smart card chip 140 is electrically coupled to the controller 110 to execute functions such as computing, encryption, bidirectional communication and security verification. In the illustrated, embodiment, the smart card chip 140 is a contact type smart card chip in accordance with the standard of ISO 7816. It is noted, however, the smart card chip of the present invention is not intended to be limited this particular type of smart card chip. For example, the smart card chip 140 may also be a contact-less type smart card chip in accordance with the standard of ISO 14443.

In the illustrated embodiment, the storage device 100 is a secure digital (SD) memory card. It is noted that, in another embodiment of the present invention, the storage device 100 may also be a multimedia card (MMC) or another memory card.

The storage device 100 further includes a bus interface 120 in addition to the controller 110, non-volatile memory 130 and smart card chip 140. The bus interface 120 is electrically coupled to the controller 110 and is used to be coupled to the host 200. In the illustrated embodiment, the bus interface 120 is an SD interface. It is noted that the bus interface 120 can also be another suitable interface. For example, when the storage device 100 is an MMC memory card, the bus interface 120 is an MMC interface.

Figure 3:
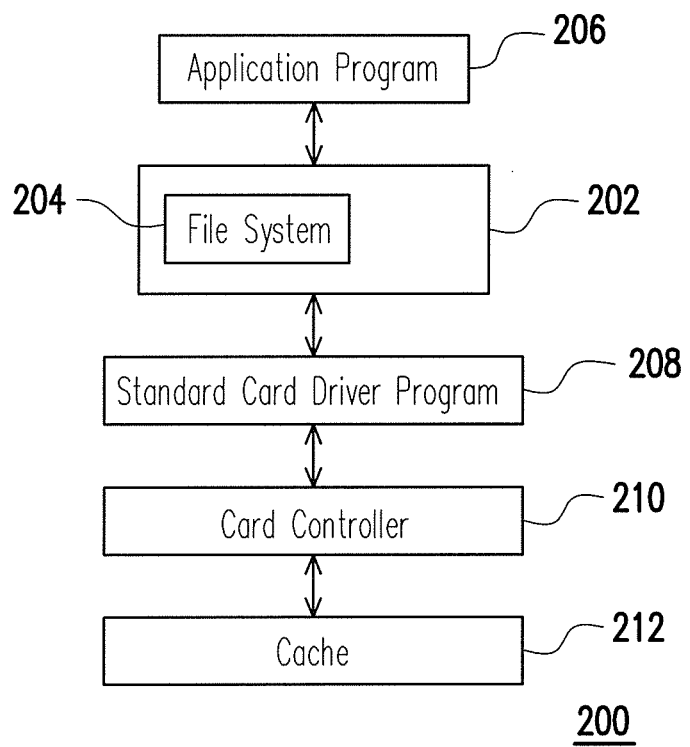
FIG. 3 is a functional block diagram of the host of FIG. 2.

The application program 206 is run to handle the storage device 100 to carry out the data transmitting and distributing method according to the embodiment of the present invention. It is noted that the host 200 also has the common function necessary for achieving the coupling of the host 200 to the storage device 100. For example, the host 200 has an operating system 202, a file system 204, a standard card driver program 208, and a card controller 210 (as shown in FIG. 3), such that the host 200 can be coupled to the storage device 100 via the operations of the standard card driver program 208 and the card controller 210, and can operate the storage device 100 via the operating system 202, file system 204 and application program 206. In the illustrated embodiment, the standard card driver program 208 transmits data and commands through the card controller 210 and the cache 212 to the storage device 100. However, in another embodiment of the present invention, the data and commands can be transmitted through the cache 212 and the card controller 210 to the storage device 100 by the standard card driver program 208. In the illustrated embodiment, all the commands and data transmitted between the host 200 and the storage device 100 is transmitted through the cache 212. It is noted, however, that in another embodiment of the present invention, the commands and data transmitted between the host 200 and the storage device 100 can bypass the cache. In an alternative embodiment, the host 200 itself can include no cache. In still another embodiment, the host 200 can execute a command of clearing the cache. In other words, the data stream transmitting and distributing method, system and controller of the system according to the present invention have no limit as to the form of the cache, operation mode of the cache, inclusion or absence of the cache, or the way the cache is coupled to other components. In addition, the host 200 can be a personal computer, a mobile phone, a notebook computer, a personal digital assistant (PDA), or the like.

Figure 4:
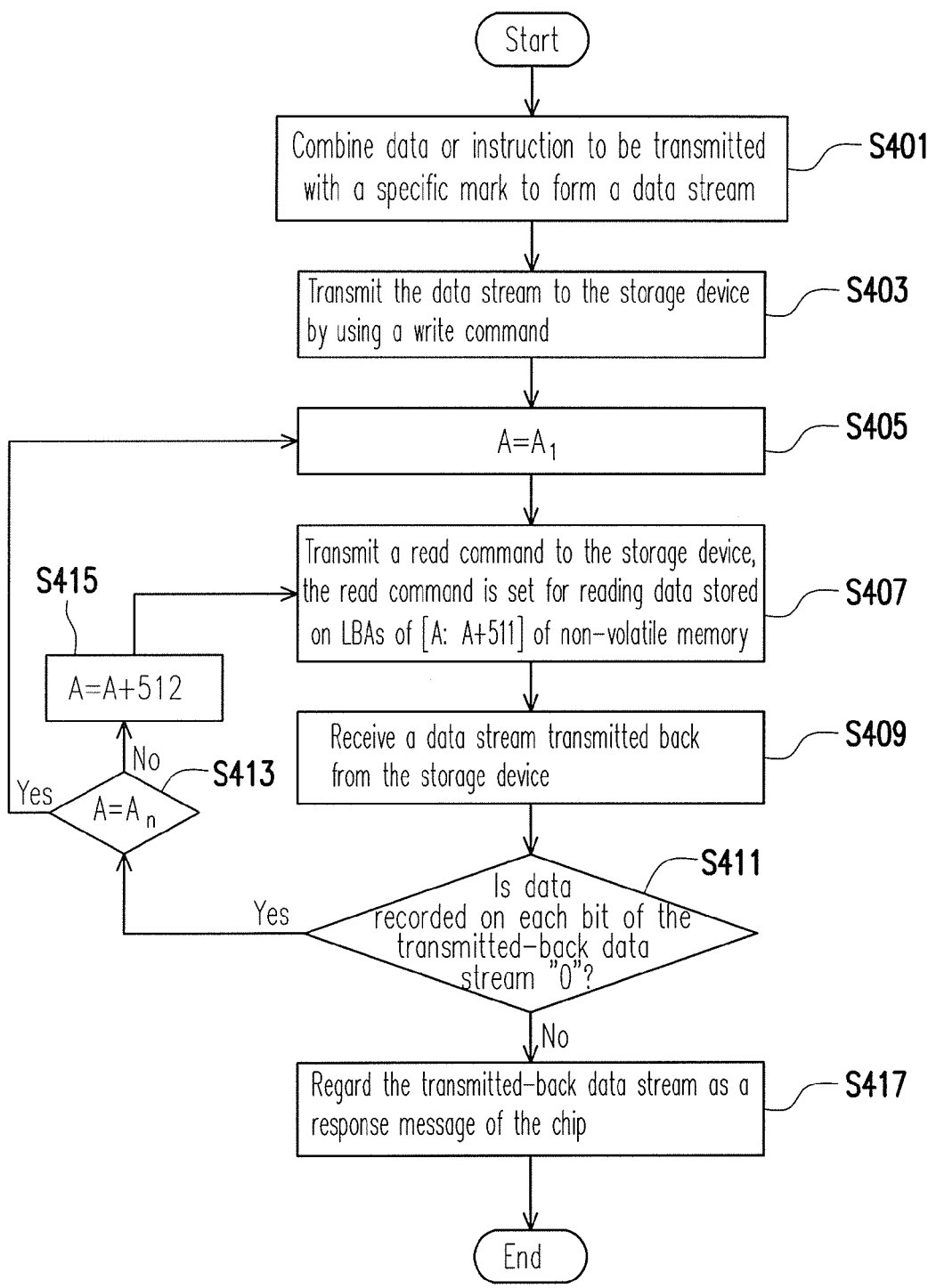
FIG. 4 is a flow chart illustrating operation of the host according to the first embodiment of the present invention.
Figure 5:
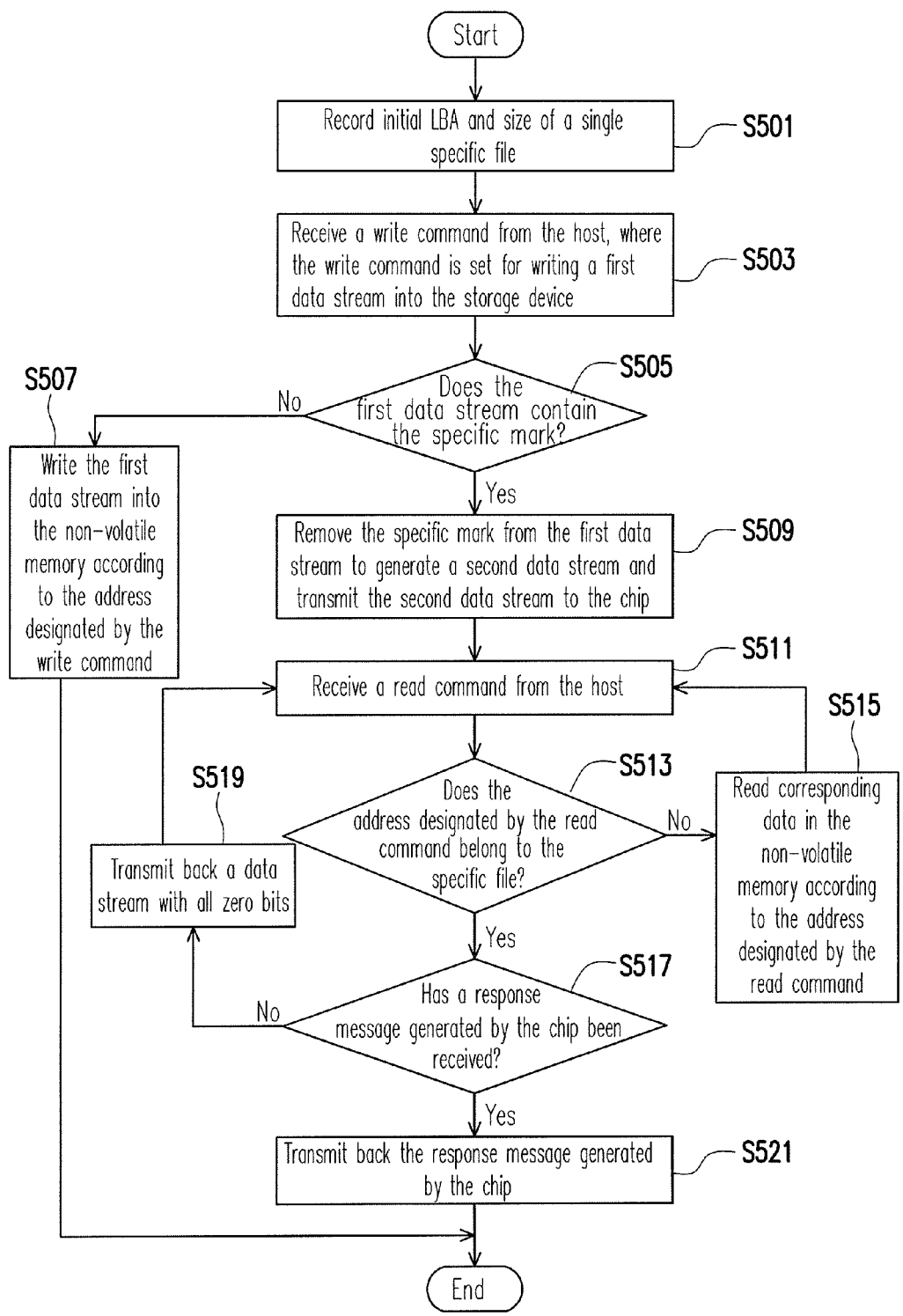
FIG. 5 is a flow chart illustrating operation of the storage device according to the first embodiment of the present invention.
Figure 6:
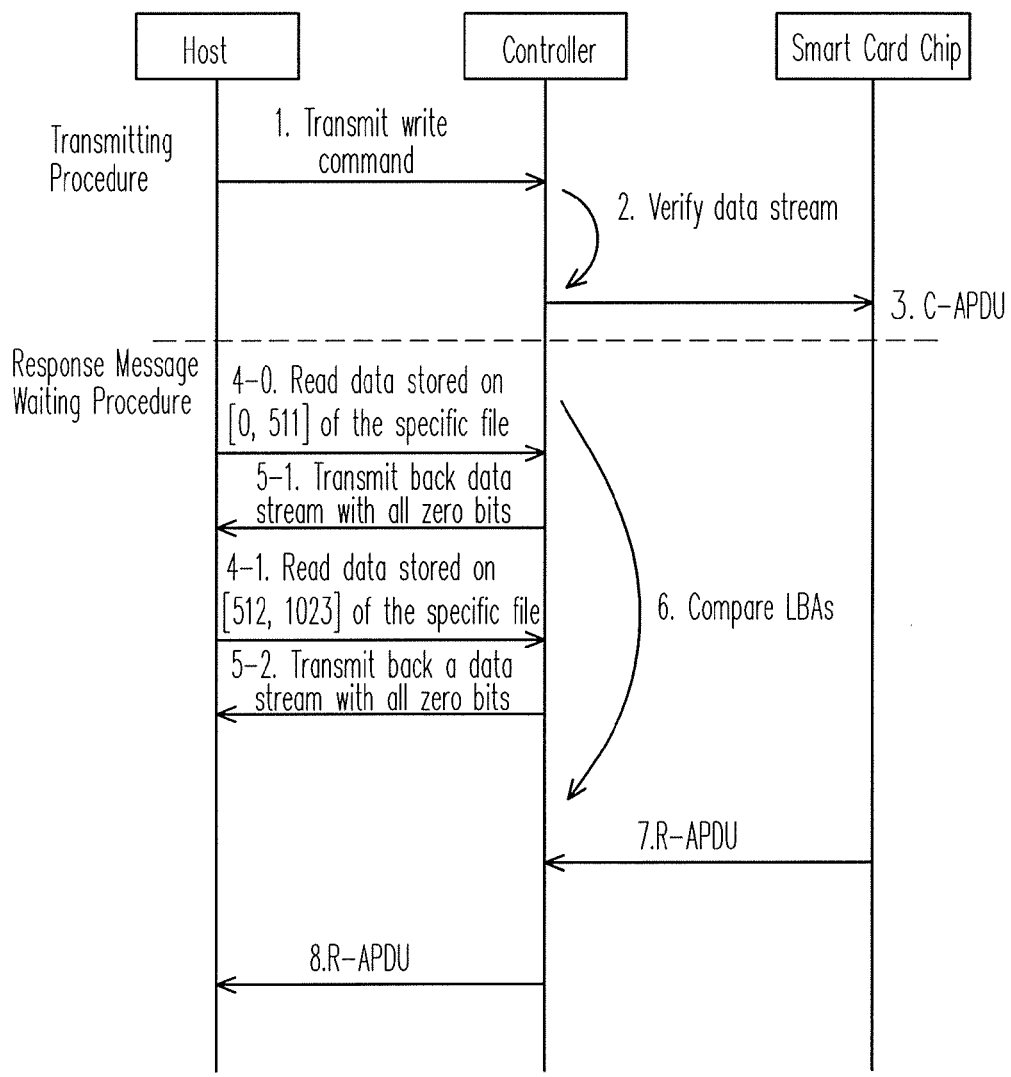
FIG. 6 is data flow diagram of the operation of FIGS. 4 and 5 according to the first embodiment of the present invention.

Thus, when the host 200 operates the storage device 100 with the non-volatile memory 130 and the smart card chip 140 as described above, according to the embodiment of the present invention, the controller 110 can cooperate with the application program 206 to correctly transmit data or commands to the smart card chip 140 and inerrably transmit a response message of the smart card chip 140 back to the host 200. The procedure of transmitting and distributing data between the controller 110 and the host 200 is described below in detail with reference to FIGS. 4 to 6. FIG. 4 is a flow chart of operation of the host 200 according to a first embodiment of the present invention. FIG. 5 is a flow chart of operation of the storage device 100 according to the first embodiment of the present invention. FIG. 6 is a data flow diagram according to the operation of FIG. 4 and FIG. 5.

Figure 7:
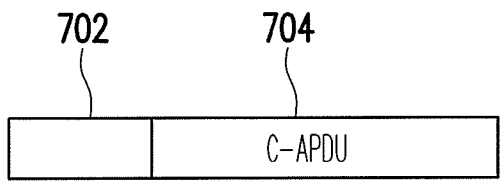
FIG. 7 is a structure of the data stream used in the first embodiment.

Referring to FIG. 4, before transmitting data or a command to the controller 110 of the storage device 100, the application program 206 of the host 200 combines the data or instruction to be transmitted with a specific mark to form a data stream (step S401). Referring to FIG. 7, in the illustrated embodiment, the data or command 704 transmitted by the application program 206 to the controller 110 is a command-application protocol data unit (C-APDU), and the C-APDU 704 and a specific mark 702 are combined to form a data stream 700. In the illustrated embodiment, the specific mark 702 is located on several most significant bits (MSBs) of the data stream 700 thus appearing in the front of the C-APDU 704. It is noted, however, that the location of the specific mark 702 in the data stream 700 is not intended to be limited to the location as described herein. For example, in another embodiment of the present invention, the bits of the specific mark 702 can be dispersed into the data stream 700 by using an encoder, and the same encoder is used subsequently to acquire the specific mark 702 from the data stream 700.

After the data stream 700 is formed, the application program 206 transmits the data stream 700 to the controller 110 of the storage device 100 by using a write command (step S403). That is, the application program 206 transmits the write command to the storage device 100, and the write command is set to write the data stream 700 to the storage device 100.

After the data stream 700 is transmitted to the controller 110 of the storage device 10, the application program 206 sequentially transmits a plurality of read commands to the controller 110 until the host 200 receives a response message generated by the smart card chip 140 from the storage device 100. These read commands are set to sequentially read data stored on a plurality of logical block addresses (LBAs) $A_1$ to $A_N$ of a single specific file in the non-volatile memory 130. Referring to FIG. 4, prior to transmitting the plurality of read commands to the storage device 100, the application program 206 sets a current read address A as an initial LBA $A_1$ (step S405). Afterwards, the application program 206 transmits one read command to the storage device 100 (step S407). Here, this read command is set to read the data stored on LBAs A to (A+511) (i.e., data of [A: A+511]) in the non-volatile memory 130. It is noted that, in the illustrated embodiment, after receiving the read command from the application program 206, the controller 110 first determines whether the received read command is set to read the data stored on LBAs $A_1$ to $A_N$. If the read command is set to read the data stored on LBAs $A_1$ to $A_N$, in practice, the controller 110 does not directly read the data of the corresponding LBAs in the non-volatile memory 130. Instead, a 512-bytes data in which all bytes are zero is generated in a temporary register and is transmitted back to the host 200, this way the time for reading the data can be reduced. In another embodiment of the present invention, the actual data recorded at each of the LBAs $A_1$ to $A_N$ of the non-volatile memory 130 may be zero.

As shown in FIG. 4, after transmitting the read command to the storage device 100, the application program 206 will await and receive the data stream sent back from the storage device 100 (Step S409). The data stream sent back from the storage device 100 is generated by the micro processing unit 110a in response to the receiving the read command. Then, the application program 206 determines whether the data recorded at each of the bits of the data stream sent back is zero (step S411). If the data recorded at each of the bits of the data stream sent back is zero, it represents that the micro processing unit 110a of the controller 110 has not received the response message from the smart card chip 140. However, if not all the data recorded at the bits of the data stream sent back is zero, it represents that the micro processing unit 110a of the controller 110 has received the response message from the smart card chip 140, in which case the application program 206 treats the received data stream as a response message from the smart card chip 140 (step S417). When the data recorded at each of the bits of the data stream sent back is zero, the application program 206 further determines whether the current read address A is equal to the last LBA $A_N$ (step S413). If the current read address A is equal to the last LBA $A_N$, it represents that the application program 206 has transmitted N read commands to the storage device 100 and, at this time, the application program 206 will again set the current read address A as the initial LBA A1 (step S405). Here, the N read commands are set to read data stored on a plurality of LBAs $A_1$ to $A_N$ of a single specific file in the non-volatile memory 130. However, if the current read address A is not equal to the last LBA $A_N$, the application program 206 will add a predetermined data length to the current read address A (step S415). In the illustrated embodiment, the predetermined data length is 512 bytes. Thus, in the illustrated embodiment, the read commands generated by the application program 206 are set to sequentially read data of an identical length (i.e., 512 bytes) from the LBAs $A_1$ to $A_N$. In another embodiment of the present invention, to simplify the operation of the application program 206, the application program 206 can obtain all of the LBAs $A_1$ to $A_N$ according to the initial LBA $A_1$ and the size of the single specific file. For example, the second LBA $A2$ is ($A_1$+512), the last LBA $A_N$ is ($A_1$+512*(N−1)), and the size of the single specific file is (512*N).

In alternative embodiments of the present invention, a table can be used to obtain the information of all the LBAs $A_1$ to $A_N$. In one embodiment, the table shows a list of all the LBAs of the specific file. In another embodiment, the table only shows the first and last LBAs of the specific file. The LBA is usually formed by sectors, and each sector usually has a data length of 512 bytes. Therefore, all the LBAs $A_1$ to $A_N$ can be obtained based on the first LBA and the last LBA. As such, in case the micro processing unit 110a determines that the address designated by the read command matches with the LBA recorded in the table, if the smart card chip 140 has not generated a response message, the micro processing unit 110a then transmits the data stream with all zero bits back to the application program 206. In addition, in alternative embodiments of the present invention, the storage device 100 actually operates without storing data on the LBAs $A_1$ to $A_N$, i.e., the specific file may be a virtual file. In such embodiments, when the micro processing unit 110a determines that the address designated by the read command belongs to the LBAs $A_1$ to $A_N$, the micro processing unit 110a directly generates a response message and transmits the response message to the host 200, thus eliminating the process of reading the non-volatile memory 130. It is also noted that the preset length of data should not be limited to 512 bytes and could be another length such as 4K, 8K. Besides, in the illustrated embodiment, each read command is set to read a preset length of data and, therefore the length of data can be changed to meet different needs. For example, the length of data can be shortened such that the data amount of the data stream transmitted back by the micro processing unit 110a of the controller 110 in response to each read command can be reduced, thus reducing the time for the microprocessor 110a to response and hence enhancing the performance of the controller 110.

Corresponding to the procedure of the operation of the host 200 shown in FIG. 4, operation of the storage device 100 can follow the procedure as shown in FIG. 5. Firstly, as the storage device starts operating, the micro processing unit 110a of the controller 110 first records the initial LBA $A_1$ and size of the single specific file (step S501) that can be used when subsequently a comparison is made with the read command generated by the application program 206. In another embodiment of the present invention, prior to recording the LBA $A_1$ and the size of the single specific file, the micro processing unit 110a determines whether the single specific file is stored in the non-volatile memory. If the single specific file does not exist in the non-volatile memory, the micro processing unit 110a will create the single specific file in the non-volatile memory 130.

After the LBA $A_1$ and the size of the single specific file are recorded, the controller 110 then starts receiving a write command from the application program 206 (step S503). The write command is set to write a first data stream into the storage device 100, and the first data stream can be the data stream 700 shown in FIG. 7 or another data stream. When the controller 110 receives the write command, it is determined whether the first data stream contains the specific mark 702 shown in FIG. 7 (step S505). If the first data stream does not contain the specific mark 702, the micro processing unit 110a of the controller 110 then writes the first data stream into the non-volatile memory 130 according to an address designated by the write command (S507). However, if the first data stream contains the specific mark 702, the micro processing unit 110a of the controller 110 will remove the specific mark 702 from the data stream to generate a second data stream (as C-APDU 704 shown in FIG. 7) and transmit the second data stream to the smart card chip 140 (step S509). As such, by verifying whether the first data stream contains the specific mark 702, the micro processing unit 110a of the controller 110 can determine whether the data stream should be transmitted to the non-volatile memory 130 or to the smart card chip 140. It is also noted that, in another embodiment of the present invention, the second data stream is the same as the first data stream. In other words, the micro processing unit 110a does not remove the specific mark 702 from the first data stream, but directly transmits the smart card chip 140. In this case, the smart card chip 140 will recognize the specific mark 702 and C-APDU 704 from the received first data stream later.

After the second data stream is transmitted to the smart card chip 140, the micro processing unit 110a of the controller then waits for receiving the read command from the application program 206 (step S511). Here, the read command includes, but not limited to, the read command transmitted by the application program 206 in the step S407 in FIG. 4. Afterwards, the micro processing unit 110a of the controller 110 determines whether the address designated by the received read command belongs to the single specific file (step S513), i.e., the micro processing unit 110a determines whether the received read command is set to read the data stored on the LBAs $A_1$ to $A_N$. If the address designated by the read command does not belong to the single specific file, the micro processing unit 110a reads the corresponding data in the non-volatile memory 130 according to the address designated by the read command (step S515), and transmits the data to the application program 206. On the other hand, if the address designated by the read command belongs to the single specific file, the micro processing unit 110a then further determines whether a response message has been received from the smart card chip 140 (step S517). In the illustrated embodiment, the response message is a response-application protocol data unit (R-APDU) that is generated by the smart card chip 140 in response to the receiving the second data stream, which can be referred to herein as a first response message. If the microprocessor 110a has not received the response message from the smart card chip 140, the micro processing unit 110a of the controller 110 then transmits the data stream with all zero bits (a second response message) back to the application program 206 (step S519) in response to the received read command and thereafter awaits a next read command from the application program 206. However, if having received the response message from the smart card chip 140, the micro processing unit 110a then transmits the response message (the data steam in which not all bits are zero) of the smart card chip 140 back to the application program 206 (S521). As such, timely transmitting the data stream with all zero bits enables the application program 206 to determine whether the data stream transmitted back is the response message of the smart card chip 140 or not.

As described above, the data stream transmission between the host 200 and the storage device 100 generally includes a transmitting procedure and a response message waiting procedure, as illustrated in FIG. 6. During the transmitting procedure, the host 200 first transmits a write command to the controller 110 (similar to steps S401 and S403 in FIG. 4), and subsequently the controller 110 verifies whether the received data stream contains a specific mark (similar to step S505 in FIG. 5). If the received data stream contains the specific mark, the controller 110 then transmits C-APDU in the data stream to the smart card chip 140 (similar to step S509 in FIG. 5). In addition, during the response message waiting procedure, if the smart card chip 140 has not generated a response message (e.g., R-APDU), the host 200 then sequentially transmits a plurality of read commands to the controller 110 and receives the data stream transmitted back from the controller 110 (similar to steps S405 and S415 in FIG. 4), and the controller 110 then compares the address designated by the read command with the LBAs $A_1$ to $A_N$ to see if they match and transmits a data stream with all zero bits back to the host (similar to steps S511 and S519 in FIG. 5). Finally, after receiving the response message generated by the smart card chip 140, the controller 110 transmits the response message generated by the smart card chip 140 to the host 200 (similar to step S521 in FIG. 5).

In addition, in the illustrated embodiment, the write address of the memory that is designated by the write command in step S403 of FIG. 4 is different from the read address of the memory that is designated by the read command in step S407 of FIG. 4. Therefore, after the host 200 transmits the read command to the controller 110, the cache 212 of FIG. 2 does not consider the data to be written into the storage device 100 according to a previous write command as cached data and thus does not transmit it back to the host 200. In addition, in the illustrated embodiment, the data amount of the single specific file is larger than or equal to the size of the cache 212, and each read command transmitted from the host is to read data stored on a different LBA. Therefore, the cached data in the cache 212 is sequentially substituted by new data and, as a result, the response message stored in the cache 212 is continuously updated such that the cache 212 always stores the newest response message. This can prevent the cache 212 from transmitting an erroneous response message to the application program 206. Thus, the response message generated by the smart card chip 140 can be inerrably transmitted back to the host 200.

Second Embodiment

As described in the first embodiment, the read commands the host 200 transmits to the storage device 100 are set to read the data stored on a plurality of LBAs $A_1$ to $A_N$ of a single specific file. Differently, in the second embodiment of the present invention, the read commands the host 200 transmits to the storage device 100 are set to read data stored on a plurality of LBAs $B_1$ to $B_N$ of a plurality of specific files $F_1$ to $F_N$ that are stored in the non-volatile memory 130.

Figure 8:
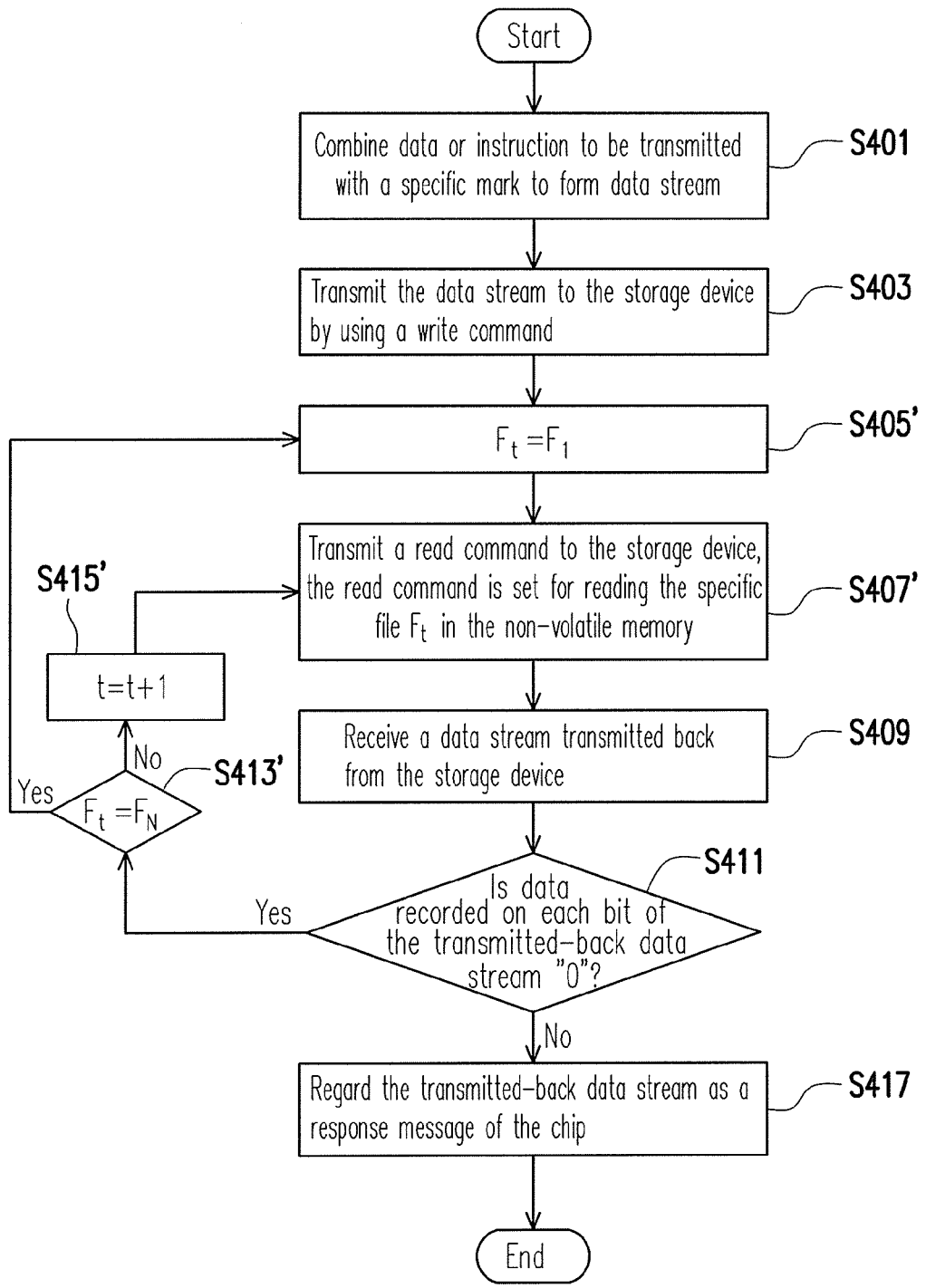
FIG. 8 is a flow chart illustrating operation of the host according to a second embodiment of the present invention.
Figure 9:
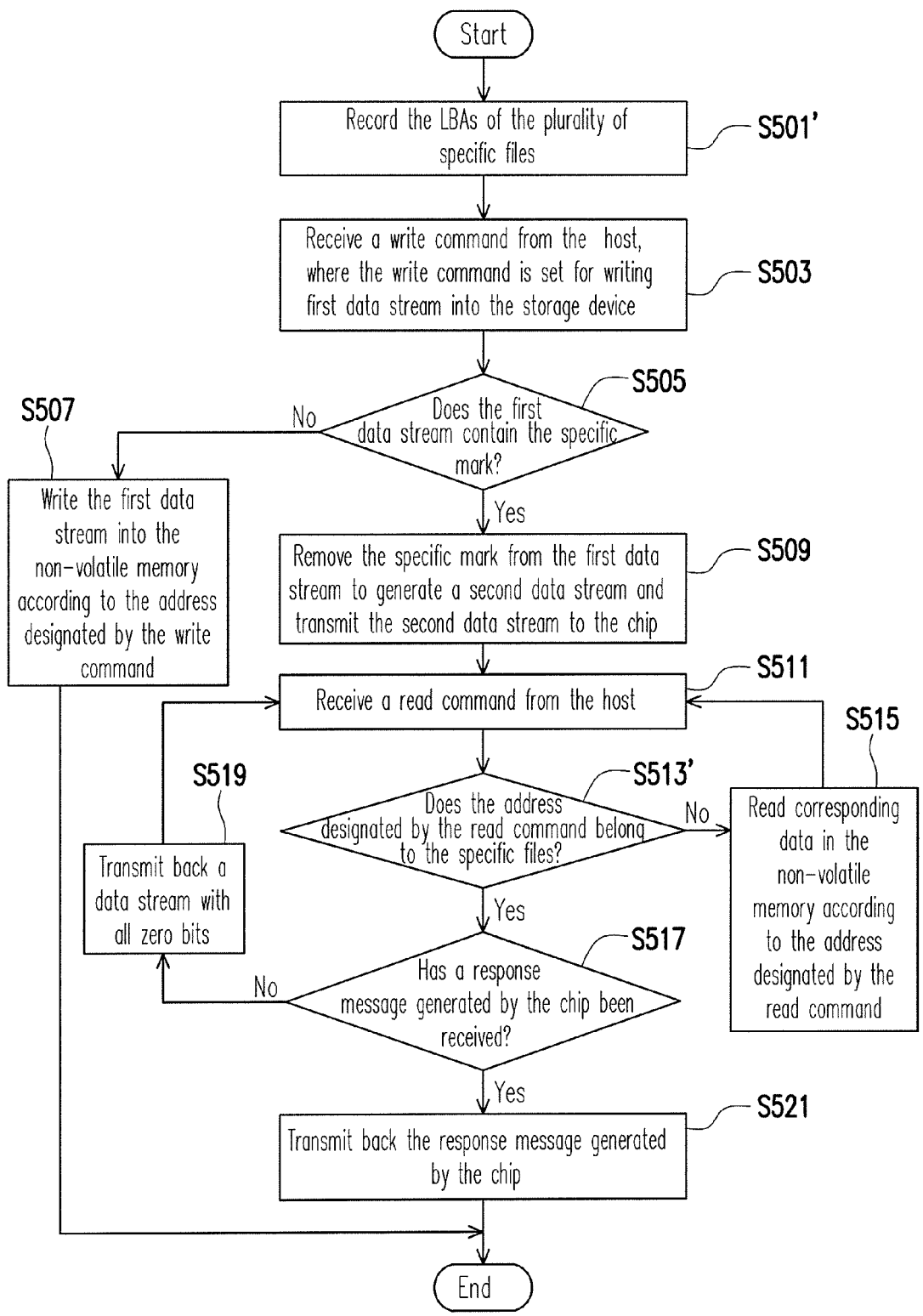
FIG. 9 is a flow chart illustrating operation of the storage device according to the second embodiment of the present invention.
Figure 10:
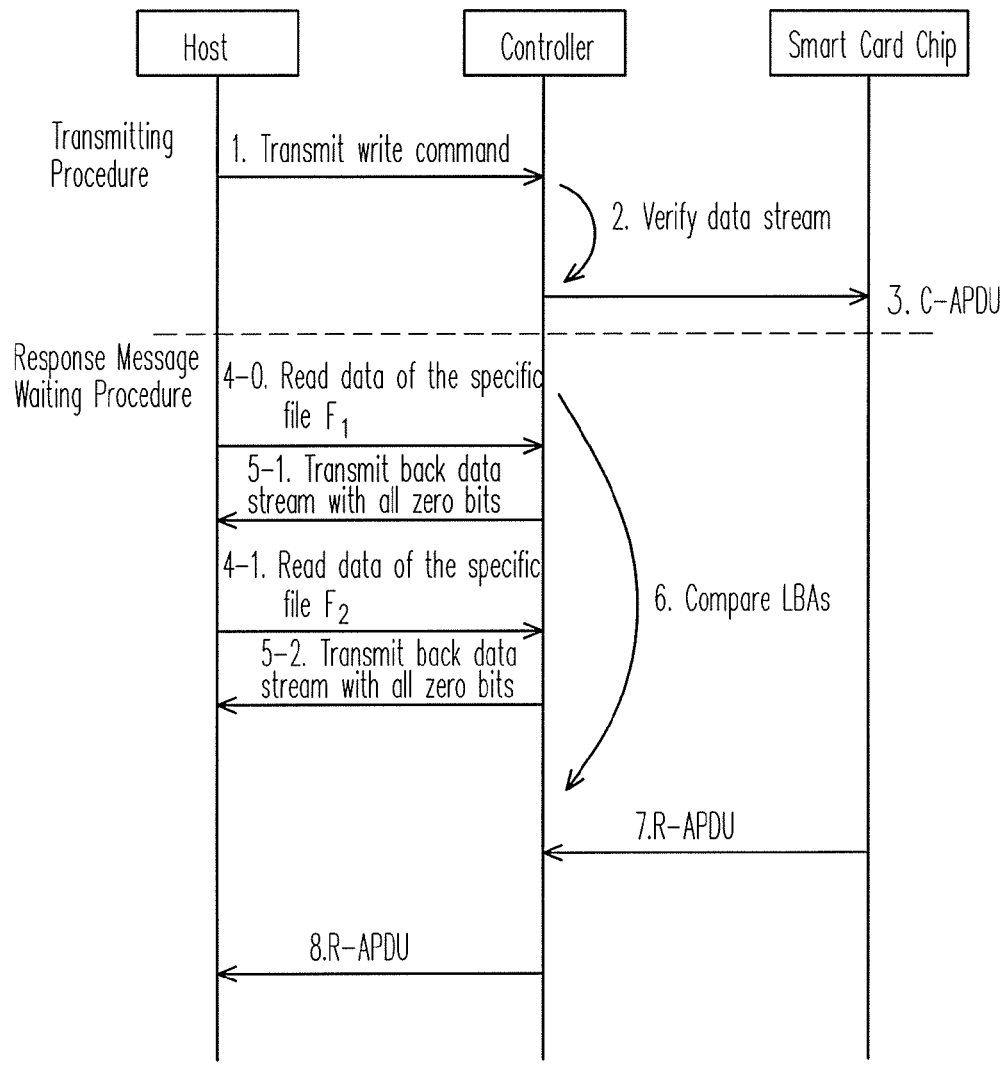
FIG. 10 is a data flow diagram of the operation of FIGS. 8 and 9 according to the second embodiment of the present invention.

FIG. 8 is a flow chart of operation of the host 200 according to a second embodiment of the present invention. FIG. 9 is a flow chart of operation of the storage device 100 according to the second embodiment of the present invention. FIG. 10 is a data flow diagram according to the operation of FIGS. 8 and 9.

The flow chart shown in FIG. 8 is similar to the flow chart shown in FIG. 4 except that the steps S405, S407, S413, and S415 of FIG. 4 are replaced with steps S405', S407', S413', and S415' of FIG. 8. The steps S401, S403, S409, S411, and S417 are the same in FIG. 4 and FIG. 8 and thus are not repeated herein. At step S405', the application program 206 sets a target file $F_t$ as a first specific file $F_1$. Afterwards, the application program 206 transmits a read command to the storage device 100 (step S407'). Here, the read command is set to read the target file $F_t$ in the non-volatile memory 130. In addition, at step S413', the application program 206 determines whether the current target file $F_t$ is the last specific file $F_N$. If the current target file $F_t$ is the last specific file $F_N$, it represents that the application program 206 has transmitted N read commands to the storage device 100 and, in this case, the application program 206 will again set the current target file $F_t$ as the first specific file $F_1$ (step S405'). However, if the current target file $F_t$ is not the last specific file $F_N$, the application program 206 will set the target file Ft as a specific file (step S415') by increasing the variable t by one. In addition, in another embodiment of the present invention, initial LBAs of the specific files $F_1$ to $F_N$ can be $B_1$ to $B_N$ (similar to the LBAs $A_1$ to $A_N$ as described in the first embodiment).

The flow chart shown in FIG. 9 is similar to the flow chart shown in FIG. 5 except that the steps S501 and S513 of FIG. 5 are replaced with step S501' and S513' of FIG. 8. The rest steps of the two flow charts are the same and thus not repeated herein. At step S501', the micro processing unit 110a of the controller 110 first records the LBAs $B_1$ to $B_N$ of the specific files $F_1$ to $F_N$. At step S513', the micro processing unit 110a of the controller 110 determines whether the address designated by the received belongs to the specific files $F_1$ to $F_N$, i.e., the micro processing unit 110a determines whether the received read command is set to read the data stored on the LBAs $B_1$ to $B_N$.

The flow chart shown in FIG. 10 is similar to the flow chart shown in FIG. 6 except that the read command the host 200 transmits to the controller 110 is set to read the specific files $F_1$ to $F_N$ during the response message waiting procedure. In addition, before the controller 110 receives the response message from the smart card chip 140, the controller 110 compares the address designated by the read command with the LBAs $B_1$ to $B_N$ to determine if they match.

Also, in another embodiment of the present invention, prior to recording the LBAs $B_1$ to $B_N$ of the specific files $F_1$ to $F_N$, the micro processing unit 110a first determines whether the specific files $F_1$ to $F_N$ exist in the non-volatile memory 130. If any one of the specific files $F_1$ to $F_N$ does not exist in the non-volatile memory 130, the micro processing unit 10a will create the specific file that does not exist in the non-volatile memory 130.

In summary, in the present invention, the host adds the specific mark into the data stream to be transmitted to the chip. Therefore, the controller can determine whether the data stream is a data stream to be transmitted to a specific chip by verifying whether the data stream includes the specific mark. In addition, during the procedure for waiting the response message from the chip, the controller executes the read commands to read the data stored on the specific LBAs and transmits the preset data stream (e.g., a data stream with all zero bits) back. When the chip generates a response message, the controller transmits the response message (e.g. a data stream in which not all bits are zero) back. As such, it can be determined whether the data stream transmitted back is the response message from the chip, and the response message generated by the chip can also be inerrably received. In addition, during waiting the response message from the chip, a plurality of the read commands is executed. The cached data in the cache is sequentially substituted by new data and, as a result, the response message stored in the cache is continuously updated such that the cache always stores the newest data. This can prevent the cache from transmitting an erroneous response message to the application program, such that the response message generated by the smart card chip can be inerrably transmitted back.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for transmitting and distributing a data stream from a host to a storage device with a non-volatile memory and a smart card chip, the method comprising:
   receiving a write command from the host, the write command being set to write a first data stream into the storage device;
   determining whether the first data stream contains a specific mark;
   transmitting at least a portion of the first data stream to the smart card chip if the first data stream contains the specific mark;
   receiving a plurality of read commands from the host, wherein the plurality of read commands are set to read data stored on a plurality of first logical block addresses in order to receive a first response message from the smart card chip;
   determining whether the first response message is received from the smart card chip, wherein the first response message is a response-application protocol data unit (R-APDU) and is produced by the smart card chip in response to receiving the at least portion of the first data stream;
   transmitting a second response message to the host if the host reads the data stored on the plurality of the first logical block addresses and the first response message is not received from the smart card chip;
   transmitting the first response message to the host if the host reads the data stored on the plurality of the first logical block addresses and the first response message is received from the smart card chip, wherein the second response message is different from the first response message, and the second response message represents that the first response message is not yet produced by the smart card chip;
   determining whether any read command transmitted from the host to the storage device is set to read the data stored on the plurality of the first logical block addresses; and
   if the any read command is not set to read the data stored on the first logical block addresses, reading the data in the non-volatile memory according to the address designated by the any read command, wherein a total amount of data stored on the plurality of the first logical block addresses is larger than or equal to a size of a cache in the host.

2. The method as claimed in claim 1, wherein data stored on the plurality of the first logical block addresses belong to a single specific file.

3. The method as claimed in claim 2, further comprising:
   determining whether the single specific file exists in the non-volatile memory; and
   creating the single specific file in the non-volatile memory if the single specific file does not exist in the non-volatile memory yet.

4. The method as claimed in claim 1, wherein data stored on the plurality of the first logical block addresses belong to a plurality of specific files.

5. The method as claimed in claim 4, further comprising:
   determining whether the plurality of specific files exist in the non-volatile memory; and
   if any one of the plurality of specific files does not exist in the non-volatile memory yet, creating that one of the plurality of specific files in the non-volatile memory.

6. The method as claimed in claim 1, wherein the data recorded at each bit of the second response message is zero.

7. The method as claimed in claim 1, further comprising:
   writing the first data stream into the non-volatile memory according to an address designated by the write command if the first data stream does not contain the specific mark.

8. The method as claimed in claim 1, wherein the plurality of read commands are set to sequentially read data of an identical length from the plurality of the first logical block addresses.

9. The method as claimed in claim 1, further comprising:
   if a response message, transmitted back to the host in response to the receiving one of the plurality of read commands, is a data stream in which not all bits are zero, determining the response message in which not all bits are zero is the first response message.

10. The method as claimed in claim 1, wherein the storage device operates without storing data on the plurality of the first logical block addresses, and the second response message is generated by the storage device in response to receiving one of the plurality of read commands.

11. A system for transmitting and distributing a data stream between a host and a storage device with a non-volatile memory and a smart card chip, the system comprising:
   an application program installed in the host and configured to handle the storage device; and
   a controller disposed in the storage device and electrically coupled to the non-volatile memory and the smart card chip;
   wherein the controller is configured to receive a write command from the application program, and the write command is set to write a first data stream into the storage device;
   wherein the controller is configured to determine whether the first data stream contains a specific mark and to transmit at least a portion of the first data stream to the smart card chip if the first data stream contains the specific mark;
   wherein the controller is configured to receive a plurality of read commands from the application program, wherein the plurality of read commands are set to read data stored on a plurality of first logical block addresses in order to receive a first response message from the smart card chip;
   wherein the controller is configured to determine whether the first response message is received from the smart card chip, wherein the first response message is a response-application protocol data unit (R-APDU) and is generated by the smart card chip in response to receiving the at least portion of the first data stream;
   wherein the controller is configured to transmit a second response message to the application program if the host reads the data stored on the plurality of the first logical block addresses and the first response message is not received from the smart card chip, and the controller is configured to transmit the first response message to the application program if the host reads the data stored on the plurality of the first logical block addresses and the first response message is received from the smart card chip;
   wherein the controller is configured to determine whether any read command transmitted from the host to the storage device is set to read the data stored on the plurality of the first logical block addresses, and the controller is further configured to read the data in the non-volatile memory according to the address designated by the any read command if the any read command is not set to read the data stored on the plurality of the first logical block addresses, wherein a total amount of data stored on the plurality of the first logical block addresses is larger than or equal to a size of a cache in the host;

wherein the second response message is different from the first response message, and the second response message represents that the first response is not yet produced by the smart card chip.

12. The system as claimed in claim 11, wherein data stored on the plurality of the first logical block addresses belong to a single specific file.

13. The system as claimed in claim 12, wherein the controller is configured to determine whether the single specific file exists in the non-volatile memory and to create the single specific file in the non-volatile memory if the single specific file does not exist in the non-volatile memory yet.

14. A controller adapted for a storage device with a non-volatile memory and a smart card chip, comprising:
   a micro processing unit configured to control overall operations of the controller;
   a memory interface configured to allow access to the non-volatile memory; and
   a buffer configured for temporarily storing data;
   wherein the micro processing unit is configured to determine whether a first data stream from a host contains a specific mark and to transmit at least a portion of the first data stream to the smart card chip if the first data stream contains the specific mark;
   wherein the micro processing unit is configured to receive a plurality of read commands from the host, wherein the plurality of read commands are set to read data stored on a plurality of first logical block addresses in order to receive a first response message from the smart card chip;
   wherein the micro processing unit is configured to determine whether the first response message is received from the smart card chip, the first response message is a response-application protocol data unit (R-APDU) and is produced by the smart card chip in response to receiving the at least portion of the first data stream; and
   wherein the micro processing unit is configured to transmit a second response message to the host if the host reads the data stored on the plurality of the first logical block addresses and the first response message is not received from the smart card chip, and the micro processing unit is configured to transmit the first response message to the host if the host reads the data stored on the plurality of the first logical block addresses and the first response message is received from the smart card chip;
   wherein the micro processing unit is configured to determine whether any read command transmitted from the host to the storage device is set to read the data stored on the plurality of the first logical block addresses, and the micro processing unit is further configured to read the data in the non-volatile memory according to the address designated by the any read command if the any read command is not set to read the data stored on the plurality of the first logical block addresses, wherein a total amount of data stored on the plurality of the first logical block addresses is larger than or equal to a size of a cache in the host;
   wherein the second response message is different from the first response message, and the second response message represents that the first response message is not yet produced by the smart card chip.

15. The controller as claimed in claim 14, wherein data stored on the plurality of the first logical block addresses belong to a single specific file.

16. The controller as claimed in claim 15, wherein the micro processing unit is configured to determine whether the single specific file exists in the non-volatile memory and to create the single specific file in the non-volatile memory if the single specific file does not exist in the non-volatile memory yet.

17. The controller as claimed in claim 14, wherein data stored on the plurality of the first logical block addresses belong to a plurality of specific files.

18. The controller as claimed in claim 17, wherein the micro processing unit is configured to determine whether the plurality of specific files exist in the non-volatile memory and to create one of the plurality of specific files in the non-volatile memory if one of the specific files does not exist in the non-volatile memory yet.

19. The controller as claimed in claim 14, wherein the data recorded at each bit of the second response message is zero.

20. The controller as claimed in claim 14, wherein the micro processing unit is configured to write the first data stream into the non-volatile memory according to an address designated by the write command if the first data stream does not contain the specific mark.

21. The controller as claimed in claim 14, wherein all the commands and data between the host and the storage device are transmitted through the cache.

* * * * *